United States Patent [19]

Szczypski

[11] Patent Number: 6,068,281

[45] Date of Patent: May 30, 2000

[54] TRAILER HITCH ASSEMBLY

[76] Inventor: Michael J. Szczypski, 614 Coronation Gardens, South Bend, Ind. 46637

[21] Appl. No.: 08/962,583

[22] Filed: Oct. 31, 1997

[51] Int. Cl.[7] ..................................................... B60D 1/16
[52] U.S. Cl. ................................. 280/479.2; 280/491.2; 280/491.5
[58] Field of Search ................. 280/491.2, 491.5, 280/493, 482, 499, 498, 479.2, 478.1, 479.3

[56] References Cited

U.S. PATENT DOCUMENTS

| | | | |
|---|---|---|---|
| 3,093,395 | 6/1963 | Boutwell | 280/478 |
| 3,126,210 | 3/1964 | Hill | 280/478 |
| 3,860,267 | 1/1975 | Lyons | 280/479.3 |
| 4,007,945 | 2/1977 | Casad et al. | 280/478 B |
| 4,792,153 | 12/1988 | Galdes | 280/477 |
| 4,944,525 | 7/1990 | Landry | 280/479.3 |
| 4,951,957 | 8/1990 | Gullickson | 280/479.2 |
| 5,067,742 | 11/1991 | Relja | 280/497.2 |
| 5,213,354 | 5/1993 | Vaughn | 280/479.2 |
| 5,236,214 | 8/1993 | Taylor | 280/402 |
| 5,277,447 | 1/1994 | Blaser | 280/479.2 |
| 5,288,095 | 2/1994 | Swindall | 280/479.2 |
| 5,322,315 | 6/1994 | Carsten | 280/479.2 |
| 5,342,076 | 8/1994 | Swindall | 280/479.2 |
| 5,423,566 | 6/1995 | Warrington et al. | 280/415.1 |
| 5,503,423 | 4/1996 | Roberts et al. | 280/479.2 |
| 5,547,210 | 8/1996 | Dugger | 280/477 |

*Primary Examiner*—Anne Marie Boehler
*Attorney, Agent, or Firm*—Taylor & Aust, P.C.

[57] ABSTRACT

A trailer hitch assembly for connecting a vehicle with a trailer includes a slide tube configured for connection with a hitch receiver channel of the vehicle. A draw bar is disposed within and slidingly carried by the slide tube. The draw bar is slidable between first and second positions relative to the slide tube. A tongue is pivotally connected to the draw bar. A device fixes the draw bar and the tongue in a predetermined angular relationship.

14 Claims, 2 Drawing Sheets

TRAILER HITCH ASSEMBLY

BACKGROUND OF THE INVENTION

1. Field of the Invention

The present invention relates to a trailer hitch assembly, and, more particularly, to a trailer hitch assembly which is removably attachable to a receiver channel at the rear of a vehicle.

2. Description of the Related Art

A hitch assembly for a vehicle typically includes an L-shaped drop which is attached to a projection. The projection is sized and configured to be received within a receiver channel at the rear of the vehicle. The trailer hitch is normally positioned out of the sight of the driver, such that it is difficult if not nearly impossible to align the hitch properly relative to the tongue of the trailer. For this reason, usually one person drives the vehicle and another person is positioned at the tongue of the trailer to direct the driver regarding placement of the hitch relative to the trailer. Alternatively, the driver may repeatedly enter and exit the vehicle to view the hitch connection in an effort to properly position the vehicle relative to the trailer.

It is known to provide a hitch assembly which includes two arms which slide and pivot relative to each other. One of the arms is received within the receiver channel of the vehicle, and is pivotally connected to a collar. The collar in turn slidably supports the other arm which is attached to the tongue for connection with the trailer. A problem with such a hitch assembly is that when a trailer is connected to the arm sliding within the collar, a large moment arm is created between the collar and tongue which makes it nearly impossible to slide the second arm relative to the collar. Moreover, the collar is simply bolted to the arm attached to the vehicle. With the weight of the trailer connected to such a hitch assembly, it is very difficult to effect the pivotal movement between the collar and the arm. Such pivotal movement is also further hindered by the large moment arm created on the second arm upon attachment with the trailer. Additionally, such a hitch assembly requires that the vehicle be backed up in order to lock the collar and arms together. If the arm connected to the trailer is already rotated to the side, backing the trailer in a straight direction will not return the two arms in substantially parallel alignment with each other.

What is needed in the art is a trailer hitch assembly which allows a single person to relatively easily and reliably connect the tongue of a trailer to the hitch assembly.

SUMMARY OF THE INVENTION

The present invention provides a trailer hitch assembly including a slide tube attachable to a vehicle and a draw bar which slides relative to the slide tube. A tongue, attachable to a trailer, is pivotally attached to the draw bar. The draw bar can be locked in position relative to the slide tube and fixed in parallel alignment with the tongue.

The invention comprises, in one form thereof, a trailer hitch assembly for connecting a vehicle with a trailer. The trailer hitch assembly includes a slide tube configured for connection with a hitch receiver channel of the vehicle. A draw bar is disposed within and slidingly carried by the slide tube. The draw bar is slidable between first and second positions relative to the slide tube. A tongue is pivotally connected to the draw bar. A device fixes the draw bar and the tongue in a predetermined angular relationship.

An advantage of the present invention is that a vehicle may be quickly and easily connected to a trailer by one person.

Another advantage is that after the trailer is connected to the vehicle, the draw bar may be fixed into parallel relationship with the tongue by simply moving the vehicle in a forward direction.

Yet another advantage is that the draw bar may be locked into place relative to the slide tube by simply decelerating the vehicle while it is moving in a forward direction.

Still another advantage is that relative angular displacement between the tongue and draw bar is limited.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
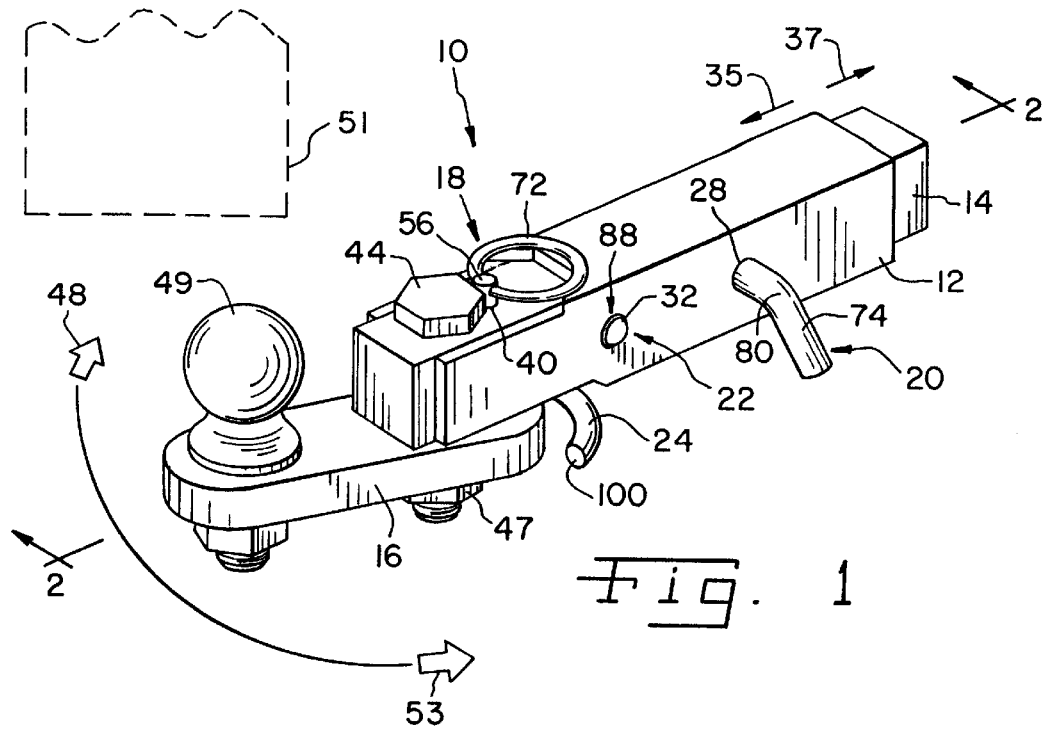
FIG. 1 is a perspective view of one embodiment of a trailer hitch assembly of the present invention.

Referring now to the drawings, there is shown an embodiment of a trailer hitch assembly 10 of the present invention. Trailer hitch assembly 10 generally includes a slide tube 12, a draw bar 14, a tongue 16, a fixing device 18 for fixing draw bar 14 and tongue 16 in a predetermined angular relationship, a confining device 20 for confining movement of draw bar 14, a locking device 22 for locking draw bar 14 in position relative to slide tube 12, and a limiting device 24 for limiting angular displacement of tongue 16 relative to draw bar 14.

Figure 3:
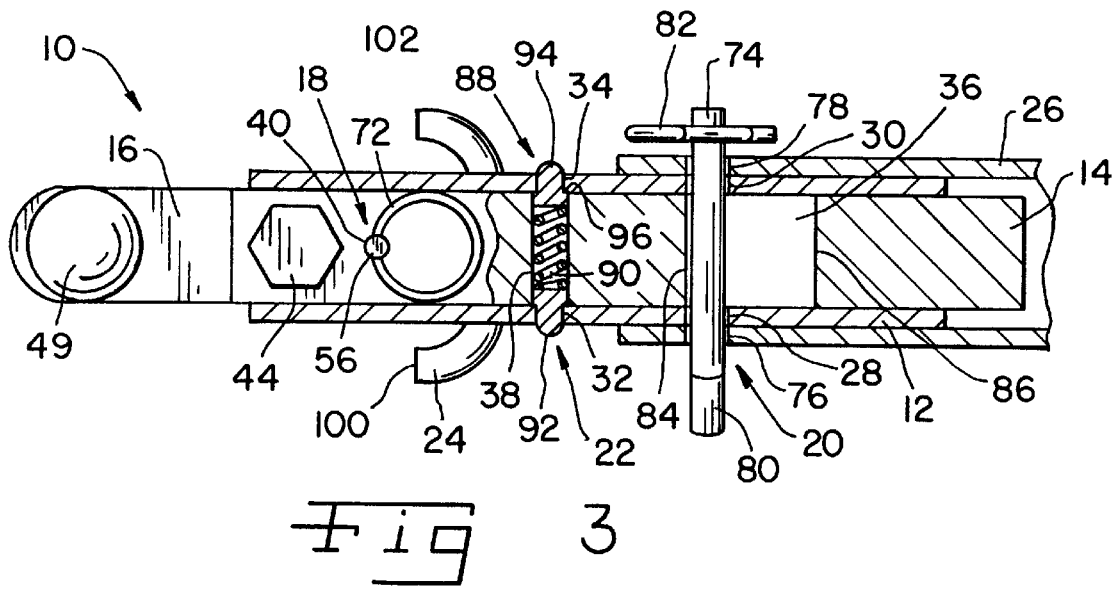
FIG. 3 is a top, partially sectioned and fragmented view of the trailer hitch assembly shown in FIG. 1 connected to a receiver channel of a vehicle.
Figure 4:
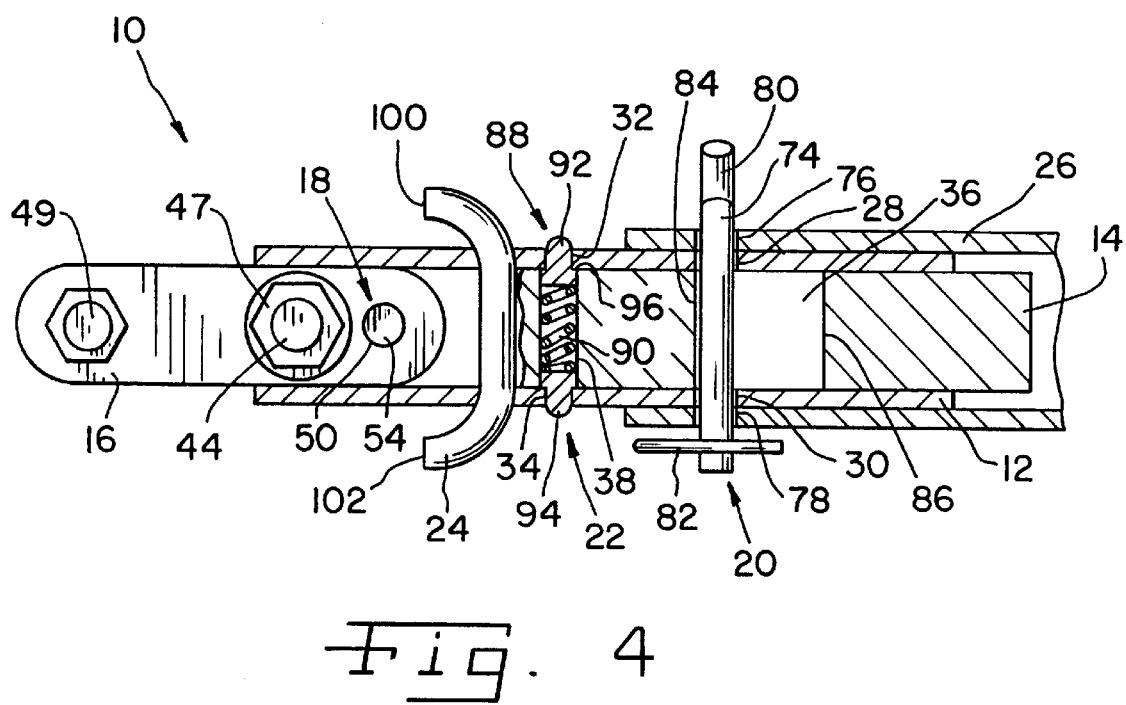
FIG. 4 is a bottom, partially sectioned and fragmented view of the trailer hitch assembly shown in FIG. 3.

Slide tube 12 is configured for connection with a vehicle. In the particular embodiment shown, slide tube 12 is configured for connection with a conventional two-inch receiver channel 26 (FIGS. 3–4), which in turn is connected to the frame of the vehicle. Slide tube 12, at the end thereof which is attached to the vehicle, includes substantially aligned third through hole 28 and fourth through hole 30 for receiving confining device 20. Slide tube 12 also includes substantially aligned fifth through hole 32 and sixth through hole 34 at the opposite end thereof, further away from the vehicle, for receiving locking device 22.

Draw bar 14 is disposed within and slidingly carried by slide tube 12. Draw bar 14 is slidingly movable relative to slide tube 12 in directions substantially parallel with the longitudinal extension of slide tube 12, as indicated by directional arrows 35 and 37. Draw bar 14 includes a horizontally oriented through slot 36 which is substantially in communication and aligned with third and fourth through holes 28 and 30, respectively, of slide tube 12. Slot 36 confines sliding movement of draw bar 14 within slide tube 12, as will be described in more detail hereinafter. Draw bar 14 also includes a horizontally oriented seventh through hole 38 which receives locking device 22 and is configured to be aligned with fifth and sixth through holes 32 and 34, respectively, of slide tube 12. Draw bar 14 further includes a vertically oriented first through hole 40 for receiving fixing device 18. On an end of draw bar 14 generally opposite the vehicle, an eighth through hole 42 receives a bolt 44 for pivotally attaching draw bar 14 to tongue 16 in a known manner.

Tongue 16 includes a ninth through hole 46 for receiving bolt 44, which is secured therein using a conventional lock nut 47. By virtue of the pivotal attachment between tongue 16 and draw bar 14, tongue 16 is pivotable around bolt 44 to one side or the other of draw bar 14, as indicated by arrows 48 and 53. Although tongue 16 is shown as being pivotally attached to draw bar 14 using a bolt and nut combination, it is to be understood that other low friction pivotal attachments may also be used, such as a bushing or bearing. Tongue 16 includes an opening 45 therein which may be used to attach a conventional hitch ball 49 thereto. Hitch ball 49 may be received within a corresponding female recess of a trailer tongue 51 represented by dashed lines in FIG. 1. Tongue 16 also includes a second through hole 50 for receiving fixing device 18 and thereby fixing tongue 16 and draw bar 14 in a predetermined angular relationship.

Figure 2:
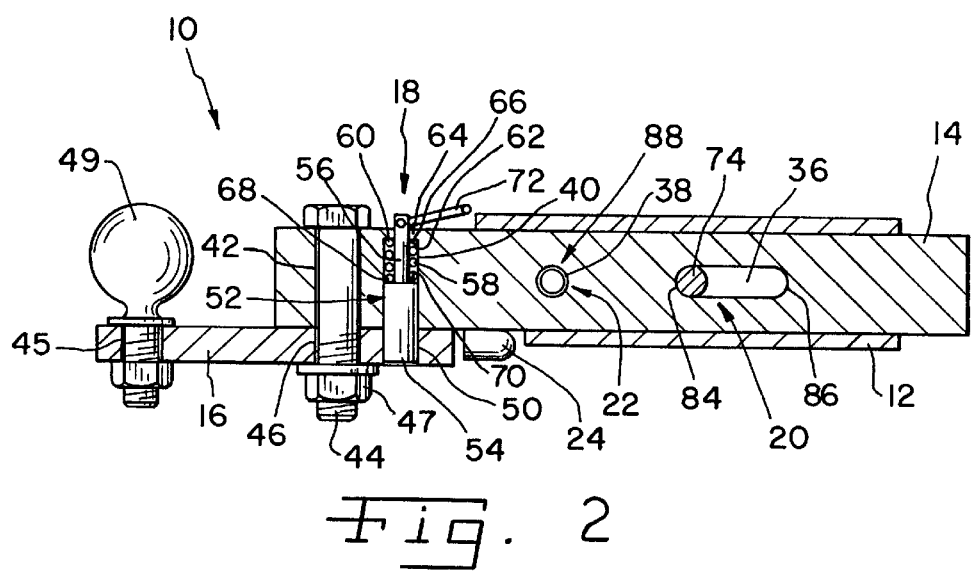
FIG. 2 is a side, partially sectioned view taken along line 2—2 in FIG. 1.

Fixing device 18 for fixing draw bar 14 and tongue 16 in a predetermined angular relationship includes an elongate member 52, a first compression spring 58, first through hole 40, second through hole 50, and handle 72. Elongate member 52 includes a stud 54 and a stem 56 attached thereto. Elongate member 52 extends through first through hole 40. A first compression spring 58 (FIG. 2) is concentrically disposed around the portion of stem 56 extending through first through hole 40. An upper longitudinal end 60 of spring 58 is biased against the lower face 62 of an annular ridge 64 at an upper longitudinal end 66 of first through hole 40. A lower longitudinal end 68 of spring 58 is biased against the upper longitudinal end 70 of stud 54. When draw bar 14 and tongue 16 are in a predetermined angular relationship, first through hole 40 of draw bar 14 and second through hole 50 of tongue 16 are substantially aligned with one another. When such alignment occurs, spring 58 pushes stud 54 into second through hole 50 of tongue 16, effectively fixing draw bar 14 and tongue 16 in the predetermined angular relationship. A handle 72, attached to stem 56, can be used to pull stud 54 up and out of second through hole 50, freeing tongue 16 to pivot out of the predetermined angular relationship with draw bar 14. In the embodiment shown, the predetermined angular relationship is the state wherein tongue 16 is aligned substantially parallel with draw bar 14. It is to be understood that other devices (not shown) can be used to fix draw bar 14 and tongue 16 in a predetermined angular relationship. For instance, a springloaded bracket can have an arm disposed on either side of draw bar 14 such that when draw bar 14 and slide tongue 16 are in alignment, the arms drop down to brace both sides of tongue 16, holding tongue 16 in alignment with draw bar 14.

Confining device 20 for confining movement of draw bar 14 relative to slide tube 12 includes a hitch pin 74, third and fourth through holes 28 and 30, and through slot 36. Hitch pin 74 passes through each of two substantially aligned apertures 76 and 78 in receiver channel 26 of the vehicle, third and fourth through holes 28 and 30 in slide tube 12, and through slot 36 in draw bar 14. In a known manner, hitch pin 74 is retained therein by a bend 80 at one end thereof and a spring or link pin 82 at an opposite end thereof. Thereby, hitch pin 74 securely links together draw bar 14, slide tube 12 and receiver channel 26. Hitch pin 74 confines movement of draw bar 14 relative to slide tube 12 between a first position and a second position. In the first position, as shown in the drawings, hitch pin 74 abuts a first longitudinal end 84 of through slot 36. In this first position, draw bar 14 is slid to its full extent, relative to slide tube 12, in the direction indicated by arrow 37. In the second position hitch pin 74 abuts a second longitudinal end 86 of through slot 36. In this second position, draw bar 14 is slid to its full extent, relative to slide tube 12, in the direction indicated by arrow 35. In this way, hitch pin 74 allows draw bar 14 to slide between the first and second positions. However, hitch pin 74 engages one of longitudinal ends 84 and 86 of slot 36 to prevent draw bar 14 from sliding outside of the first and second positions relative to slide tube 12. Of course, other mechanisms can be used to confine sliding movement of draw bar 14 between first and second positions relative to slide tube 12. For example, draw bar 14 can be provided with projections on its periphery on opposite longitudinal sides of slide tube 12. The projections would engage the longitudinal ends of slide tube 12 and physically block draw bar 14 from sliding relative to slide tube 12 out of a predetermined range.

Locking device 22 for locking draw bar 14 in position relative to slide tube 12 includes an automatic locking mechanism 88, seventh through hole 38, fifth through hole 32 and sixth through hole 34. Automatic locking mechanism 88 extends through seventh through hole 38 of draw bar 14. Mechanism 88 includes a second compression spring 90 and buttons 92 and 94 which are attached at each respective longitudinal end of spring 90. When draw bar 14 is in the first position relative to slide tube 12, seventh through hole 38 of draw bar 14 is substantially aligned with fifth and sixth through holes 32 and 34, respectively, of slide tube 12. When such alignment occurs, spring 90 pushes buttons 92 and 94 into fifth and sixth through holes 32 and 34, respectively, effectively locking draw bar 14 in the first position relative to slide tube 12. Each button 92 and 94 includes an annular ledge 96 which engages the outside edge of fifth through hole 32 or sixth through hole 34. In another embodiment (not shown), seventh through hole 38 includes an annular ridge at each longitudinal end thereof for engaging a ledge 96 of buttons 92 and 94. The ridges serve to slightly reduced the diameter of seventh through hole 38 at each of its longitudinal ends, thereby ensuring the retention of buttons 92 and 94 within seventh through hole 38. Of course, other mechanisms can be used to lock draw bar 14 in a first position relative to slide tube 12.

A limiting device 24 for limiting angular displacement of tongue 16 relative to draw bar 14 is in the form of a U-shaped stop piece 24 rigidly attached to draw bar 14. Stop piece 24 is oriented in the same general horizontal plane as tongue 16. From an orientation wherein tongue 16 is in substantial parallel alignment with draw bar 14, tongue 16 is rotatable relative to draw bar 14 in either of two directions, as indicated by directional arrows 48 and 53. Stop piece 24 includes two opposing ends 100 and 102, each of which is configured to block further rotation of tongue 16 relative to draw bar 14 at approximately 90° from the parallel alignment. Thus, tongue 16 is free to rotate within an approximately 180° arc. However, it is to be understood that stop piece 24 can be configured to allow tongue 16 to rotate within an arc of substantially any width or angle. Stop piece 24 can be integral with draw bar 14 or can be welded or otherwise rigidly attached to draw bar 14. Of course, other mechanisms can be used to limit the angular displacement of tongue 16 relative to draw bar 14. For example, a stop piece can be rigidly attached to the top side of tongue 16, the stop piece having opposing ends for engaging draw bar 14 at predetermined angular displacements of tongue 16 relative to draw bar 14.

To connect hitch assembly 10 to a tongue 51 of a trailer, the vehicle is positioned such that tongue 16 is located within several inches from tongue 51 of the trailer. More particularly, tongue 16 must be positioned relative to tongue 51 of the trailer within a first distance, equal to a second distance between the first and second positions. This second distance is the distance which draw bar 14 may slide relative to slide tube 12. Buttons 92 and 94 are pressed inwardly, releasing draw bar 14 for sliding relative to slide tube 12. Draw bar 14 is slid slightly relative to slide tube 12 (as indicated by directional arrows 35 and 37), moving automatic locking mechanism 88 out of alignment with fifth and sixth through holes 32 and 34, respectively, of slide tube 12. Handle 72 is then pulled in an upward direction until stud 54 of elongate member 52 prevents further upward movement. In the upward position, the bottom end of stud 54 is disposed slightly above second through hole 50 in tongue 16, but still within first through hole 40 of draw bar 14. Since stud 54 is not disposed within second through hole 50 of tongue 16, tongue 16 may be pivoted relative to draw bar 14 (as indicated by directional arrows 48 and 53). Ball 49 is positioned in substantial alignment with the recess in tongue 51 of the trailer by the sliding action of draw bar 14 and the pivotal action of tongue 16, and tongue 16 is thereafter connected to tongue 51 of the trailer. The user then moves the vehicle in a forward direction, which in turn slides draw bar 14 in a direction indicated by arrow 35 into its second position. The forward movement of the vehicle simultaneously rotates tongue 16 into substantially parallel alignment with draw bar 14. When tongue 16 is in substantially parallel alignment with draw bar 14, first through hole 40 of draw bar 14 and second through hole 50 of tongue 16 are likewise disposed substantially in alignment with each other, thereby allowing stud 54 to drop into second through hole 50 of tongue 16 under the bias of spring 58. The user then brakes the vehicle while it is moving in a forward direction, which in turn allows the momentum of the trailer to push and slide draw bar 14 in a direction indicated by arrow 37 into its first position relative to slide tube 12. When draw bar 14 is in its first position, seventh through hole 38 of draw bar 14 and fifth and sixth through holes 32 and 34, respectively, of slide tube 12 are disposed substantially in alignment with each other, thereby allowing buttons 92 and 94 to be pushed into fifth through 32 and sixth through hole 34, respectively of tongue slide tube 12 under the bias of spring 90. The trailer is thus connected to hitch assembly 10 and the various parts forming hitch assembly 10 are locked into place relative to each other.

Slide tube 12 is shown as being received within and carried by receiver channel 26, which, in turn, is attached to a vehicle. However, in another embodiment (not shown), slide tube 12 is directly attached to the vehicle. Thus, there is no need in this embodiment for a receiver channel to interconnect slide tube 12 with the vehicle.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A trailer hitch assembly for connecting a vehicle with a trailer, comprising:
    a receiver channel coupleable with the vehicle, the receiver channel two substantially aligned apertures;
    slide tube having two substantially aligned through holes, said two through holes configured for being substantially aligned with the apertures of the receiver channel, said slide tube configured for being disposed within and attached to the receiver channel;
    a draw bar disposed within and slidingly carried by said slide tube, said draw bar being slidable between a first position and a second position relative to said slide tube, said draw bar having a through slot configured for being substantially aligned with said two through holes of said slide tube and the apertures of the receiver channel;
    a hitch pin extending through said two through holes of said slide tube, said through slot of said draw bar, and the apertures of the receiver channel;
    a tongue which is pivotally connected to said draw bar; and
    means for fixing said draw bar and said tongue in a predetermined angular relationship.

2. The trailer hitch assembly of claim 1, wherein said predetermined angular relationship of said trailer hitch assembly comprises said tongue extending substantially parallel to said draw bar.

3. The trailer hitch assembly of claim 1, wherein said fixing means of said trailer hitch assembly comprises a first through hole in said draw bar, a second through hole in said tongue, and an elongate member configured for being simultaneously received within each of said through holes, said through holes being substantially aligned when said draw bar and said tongue are in said predetermined angular relationship.

4. The trailer hitch assembly of claim 3, wherein said fixing means of said trailer hitch assembly further comprises a first spring biasing said elongate member into said second through hole.

5. The trailer hitch assembly of claim 4, wherein said fixing means of said trailer hitch assembly further comprises a handle attached to said elongate member, said handle disposed on a side of said draw bar opposite said tongue, said handle configured for pulling said elongate member out of said second through hole.

6. The trailer hitch assembly of claim 1, wherein said trailer hitch assembly further comprises a means for confining movement of said draw bar between said first position and said second position.

7. The trailer hitch assembly of claim 6, wherein said confining means of said trailer hitch assembly comprises third and fourth substantially aligned through holes in said slide tube, a through slot in said draw bar substantially aligned with said third and fourth through holes, and a hitch pin extending through said third and fourth through holes and said through slot.

8. The trailer hitch assembly of claim 1, wherein said trailer hitch assembly further comprises a means for locking said draw bar in said first position.

9. The trailer hitch assembly of claim 8, wherein said locking means of said trailer hitch assembly comprises fifth and sixth substantially aligned through holes in said slide tube and a seventh through hole in said draw bar, said seventh through hole being substantially aligned with said fifth and sixth through holes when said draw bar is in said first position, said locking means further comprising an automatic locking mechanism configured for extending through said fifth, sixth and seventh through holes when said draw bar is in said first position.

10. The trailer hitch assembly of claim 9, wherein said automatic locking mechanism of said trailer hitch assembly comprises a second spring having two opposing ends, and first and second buttons engaged with a respective said opposing end of said second spring, said second spring biasing said first and second buttons into said fifth and sixth through holes, respectively, when said draw bar is in said first position.

11. The trailer hitch assembly of claim 1, wherein said trailer hitch assembly further comprises a means for limiting angular displacement of said tongue relative to said draw bar.

12. The trailer hitch assembly of claim 11, wherein said limiting means of said trailer hitch assembly comprises a stop piece attached to said draw bar.

13. The trailer hitch assembly of claim 12, wherein said stop piece of said trailer hitch assembly is U-shaped.

14. The trailer hitch assembly of claim 1, wherein said tongue of said trailer hitch assembly is closer to said slide tube when said draw bar is in said first position than when said draw bar is in said second position.

* * * * *

UNITED STATES PATENT AND TRADEMARK OFFICE
CERTIFICATE OF CORRECTION

PATENT NO. : 6,068,281
DATED : May 30, 2000
INVENTOR(S) : Michael J. Szczypski

It is certified that error appears in the above-identified patent and that said Letters Patent is hereby corrected as shown below:

COVER SHEET

Section 56,
add -- "OTHER REFERENCES

Northern Hydraulics Catalog, Inc., Fall/Winter Master Catalog, P.167

Sales Flier by PRO-hitch Manufacturing, Inc. for PRO-hitch.

Sales Flier by Rosemonte Manufacturing, Inc. for MASTERHITCH."

COLUMN 6

Line 8, after "channel" insert --having--;

Line 9, before "slide" insert --a--.

Signed and Sealed this

Tenth Day of April, 2001

*Attest:*

NICHOLAS P. GODICI

*Attesting Officer*   Acting Director of the United States Patent and Trademark Office